US010484031B2

(12) United States Patent
Chavez

(10) Patent No.: US 10,484,031 B2
(45) Date of Patent: Nov. 19, 2019

(54) MOTORCYCLE COMMUNICATION SYSTEM AND METHOD

(71) Applicant: Danyel Chavez, Sylmar, CA (US)

(72) Inventor: Danyel Chavez, Sylmar, CA (US)

( * ) Notice: Subject to any disclaimer, the term of this patent is extended or adjusted under 35 U.S.C. 154(b) by 76 days.

(21) Appl. No.: 15/440,886

(22) Filed: Feb. 23, 2017

(65) Prior Publication Data

US 2018/0241425 A1   Aug. 23, 2018

(51) Int. Cl.
*H04W 4/02* (2018.01)
*G08G 1/16* (2006.01)
*H04B 1/3822* (2015.01)
*H04W 68/00* (2009.01)
*H04W 76/14* (2018.01)
*H04W 4/08* (2009.01)
*H04W 84/18* (2009.01)
*H04W 8/18* (2009.01)
*H04W 4/46* (2018.01)

(52) U.S. Cl.
CPC .......... *H04B 1/3822* (2013.01); *G08G 1/163* (2013.01); *H04W 4/023* (2013.01); *H04W 4/027* (2013.01); *H04W 4/08* (2013.01); *H04W 68/005* (2013.01); *H04W 76/14* (2018.02); *H04W 4/46* (2018.02); *H04W 8/186* (2013.01); *H04W 84/18* (2013.01)

(58) Field of Classification Search
CPC ....... B60K 31/18; B60K 35/00; B60W 30/08; G08G 1/052; G08G 1/163; H04W 4/023; H04W 4/027; H04W 4/12; H04W 4/08; H04W 76/14; H04B 1/3822
USPC ..... 370/252, 328, 329, 338; 455/418, 456.3, 455/456.1
See application file for complete search history.

(56) References Cited

U.S. PATENT DOCUMENTS

| | | | |
|---|---|---|---|
| 9,744,905 B1* | 8/2017 | Assam | B60K 31/18 |
| 2014/0099921 A1* | 4/2014 | Weiss | H04W 4/023 |
| | | | 455/411 |
| 2016/0174132 A1* | 6/2016 | Hynes | H04W 4/027 |
| | | | 455/418 |
| 2017/0210323 A1* | 7/2017 | Cordova | B60W 30/08 |
| 2017/0223168 A1* | 8/2017 | Singh | H04W 4/12 |
| 2018/0261014 A1* | 9/2018 | Seo | G08G 1/163 |

* cited by examiner

*Primary Examiner* — Harun Chowdhury
(74) *Attorney, Agent, or Firm* — Mu P.C.

(57) ABSTRACT

A system of communication comprising a mobile device comprising: a processor; a display in communication with to the processor; an accelerometer in communication with the processor; a gyroscope in communication with the processor; a communicator configured to wirelessly transmit and receive signals; and a geo-locator adapted to determine a rider location; wherein the processor receives information from the communicator to create a group and determine a group location; and a method of communication comprising the steps of: the processor monitoring the accelerometer; the processor monitoring the gyroscope; the processor monitoring the geo-locator; determining the group location; determining a crash baseline; monitoring for a crash; sending a crash alert; and sending a user-generated alert.

4 Claims, 5 Drawing Sheets

MOTORCYCLE COMMUNICATION SYSTEM AND METHOD

CROSS-REFERENCE TO RELATED APPLICATION(S)

The present application claims priority to U.S. Provisional Patent Application No. 62/298,816 filed on Feb. 23, 2016, entitled "MOTORCYCLE COMMUNICATION SYSTEM," the entire disclosure of which is incorporated by reference herein.

BACKGROUND OF THE INVENTION

1. Field of the Invention

The present invention relates generally to the field of communication devices and, more specifically, relates to an attachable communication device for a motorcycle that may provide a touch screen visual aid useful for alerting other riders.

2. Description of Related Art

Motorcycle drivers and riders of today are more educated about the risks associated with riding a motorcycle. A motorcyclist's risk of a fatal crash is approximately times greater than a passenger car. This often lends motorcyclists to look towards more safety options for their vehicle. Communications between multiple local motorcycles can be a way to help inform other local drivers of potential risks. Motorcyclists cannot safely talk on a handheld mobile phone while driving a vehicle without a headset or other safety means.

Additionally, motorcyclists often ride alone. When riding alone, a motorcyclist may experience a crash that may render the motorcyclist incapable of calling for help. Even if the motorcyclist is able to reach his or her mobile device to call for help, the mobile device may not have cellular connectivity or the contact information for other nearby motorcyclists.

Based on the foregoing, there is a need in the art for a safe and easy to use communications device between multiple local riders of motorcycles. Additionally, there is a need in the art for a system and method for autonomously generating and sending crash alerts. Such a need has heretofore remained unsatisfied.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
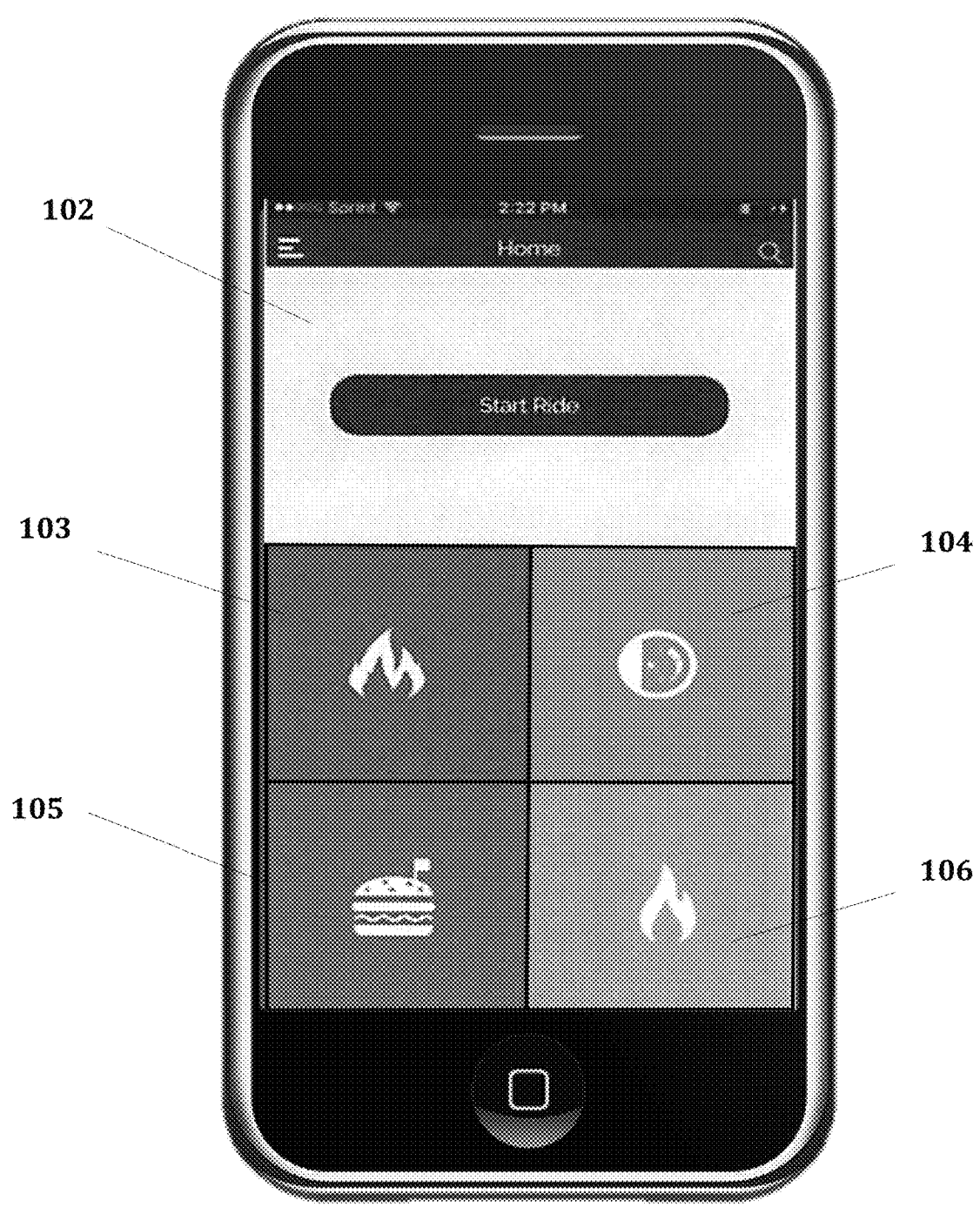
FIG. 1 is an exemplary view of the motorcycle communication system interface, according to an embodiment of the present invention.

Preferred embodiments of the present invention and their advantages may be understood by referring to FIGS. 1-4 wherein like reference numerals refer to like elements.

In an exemplary embodiment of the present disclosure, the system and method uses a mobile device and a program loaded thereon, known as an app. The mobile device comprises any device that uses wired or wireless data transmission technology comprising cellular telephones, laptop computers, tablets, global positioning satellite ("GPS") navigation devices, walkie-talkies, and Internet of Things ("I.o.T.") devices. In another embodiment, the mobile device may use wireless communication technology comprising cellular data transmission, LTE, LTE Direct, Bluetooth, Bluetooth LE, radio frequency, near-field and infrared. In a preferred embodiment, the mobile device may communicate with other mobile devices using cellular networks, for example 3G, 4G, GSM and LTE. In another embodiment, the mobile device may communicate directly with other mobile devices. In another embodiment, the mobile devices may be configured to receive and relay signals from one mobile device to another mobile device, also known in the art as a "daisy chain."

In another exemplary embodiment of the present disclosure, a rider downloads and installs the app on the rider's mobile device. Once installed, the rider may create a rider account by inputting a unique username and password, which the rider may use to log into a rider account. The rider account may have a profile including the type of motorcycle and photos, as well as address, email and phone number. An emergency contact may be listed. In one embodiment, the rider account may be stored locally. In another embodiment, the rider account may be stored remotely on a remote database or other cloud-based computing system. The app may use the mobile device's built-in communication ability such as cellular or Wi-Fi to communicate with the remote database or the cloud-based computing system.

In another exemplary embodiment of the present disclosure, the app may comprise a group ride mode wherein the app may be installed on a plurality of mobile devices, each mobile device belonging to an individual motorcyclist within a group. A rider may create a group within the app wherein a group name and password are entered into the app. Each rider may log into a particular group by inputting the predetermined group name and password. In such a configuration, the app installed on the plurality of mobile devices may communicate information between the mobile devices thereby allowing the individual riders within the group to communicate with one another. In another embodiment, a rider may invite other users to the group though the app's contacts list. The group ride mode serves to maintain communication between riders within a group even when the individual riders may not see each other due to distance or visual obstruction.

In another exemplary embodiment of the present disclosure, the mobile device may be mounted near or on the motorcycle's handlebars such that its screen is in plain view of the rider while riding. In another embodiment, the rider mobile device is mounted on the rider's motorcycle such that the rider is easily able to operate the touch screen of the mobile device.

In another exemplary embodiment of the present disclosure, a motorcycle rider downloads and installs the app onto a mobile device. The app may utilize the mobile device's computing ability to execute the app's algorithms. The app may also utilize the mobile device's built-in GPS ability to orient the rider's position using a geographic overlay. In another embodiment, the app may use the mobile device's built-in accelerometer and gyroscopes to determine the three-dimensional orientation and acceleration of the mobile device.

In another exemplary embodiment of the present disclosure, the app may restrict any alerts from being displayed on the mobile device while in use. This restriction serves to limit the rider's distractions while riding a motorcycle thereby allowing the rider to focus on riding. In another embodiment of the present disclosure, the app may display two large, touch sensitive alert squares in bright contrasting colors. In another embodiment, one alert square may also display a user's name corresponding to the rider whom the alert pertains. The second alert square may also display an icon relating to the type of alert. In another embodiment, the alert squares may comprise colors relating to the severity of the alert conveyed. Such colors comprise green representing good, yellow representing caution, red representing stop, flashing red representing emergency stop, and magenta representing a an accident. In another embodiment of the present disclosure, any rider within a group may reset the alert displayed on each device logged into a group ride mode. In another embodiment, the app may provide preset alerts, colors, and icons. In another embodiment, a user may determine the colors, icons, and alerts displayed by the app.

In another embodiment of the present disclosure, the app may use the mobile device's GPS capability, accelerometers, and gyroscopes to determine if the rider is currently engaged in riding a motorcycle. If the app determines that the rider is riding a motorcycle, the app may restrict alerts and functionality of the mobile device to limit the rider's distractions. If the app determines the rider is not riding a motorcycle, the app may not restrict the mobile device in any way. In another embodiment, the app provides a scrollable list of riders within a group and allows a rider to communicate with the other riders individually or as a group. In another embodiment, the app provides a "push-to-talk" or walkie-talkie function while the rider is not engaged in riding a motorcycle.

In another exemplary embodiment of the present disclosure, the app utilizes the mobile device's geo-positional features to locate the rider. In one embodiment, the app provides the mobile device's real-time position overlaid onto a map. In one embodiment, the app uses geographic information downloaded from preexisting services such as GOOGLE MAPS to create the positional overlay. In another embodiment, the app may use geographic data stored locally on the mobile device. In such a configuration, the app will continue to function even when the mobile device loses cellular connection. In another embodiment, the system may monitor the signal strength between two mobile devices to determine the distance between the two corresponding riders. In another embodiment, the system may autonomously generate and send alerts to other riders indicating that a rider has exceeded a preset distance. In such event, the system may guide the other riders of the group to a location that is safe to pull over and wait for the lost rider while the system guides the lost rider back to the group. In one embodiment, the system guides a lost rider and the group to the same location.

In another exemplary embodiment of the present disclosure, the app may feature a crash detector wherein the app utilizes the mobile device's built-in GPS, accelerometers, and gyroscopes to determine if the rider experienced a crash. In another embodiment, the app utilizes an external device capable of monitoring, recording, and sending acceleration and deceleration data. In another embodiment, the app continually monitors the mobile device's built-in GPS, accelerometers, and gyroscopes and compares the values to predetermined levels. If the monitored values exceed the predetermined levels, the app may autonomously send a crash alert. In one embodiment, the app may send the crash alert to every rider logged into a particular group. In another embodiment, the app may autonomously send the crash alert to predetermined contacts retrieved from the mobile device. In another embodiment, the app may autonomously send a crash alert to emergency personnel.

In another exemplary embodiment of the present disclosure, the system may use accelerometers, speedometers, or gyroscopes attached to or integrated into the motorcycle. Many newer motorcycles feature built-in gyroscopes, speedometers, and accelerometers to detect lean angle, calculate optimal throttle position, and calculate optimal breaking force. In one embodiment, the system connects wirelessly to the motorcycle's built-in accelerometers, speedometers, or gyroscopes to determine if the motorcycle is moving or if the rider has experienced a crash. In another embodiment, the system connects to the motorcycle's onboard sensors using a wired connection.

In another exemplary embodiment of the present disclosure, the system comprises a range detector wherein the app alerts riders if another rider within the group exceeds a predetermined distance from the group. The app generates an alert directing the group to pull over at a safe location allowing the lost rider to rejoin the group.

In another exemplary embodiment of the present disclosure, the system continuously monitors for lost riders in a group ride. If a rider in a group ride is not within a predetermined distance of the group, the system provides the rider with graphical directions guiding the rider to the group.

In another exemplary embodiment, the system provides social media, events, scheduling, news, a friend list, and a profile to every rider using the system.

In another exemplary embodiment of the present disclosure and with reference to FIG. 1, the system comprises at mobile device, on which an app 101 is installed. The app 101 uses the mobile device's built-in touch screen to display various options for the rider comprising "buttons" or screen space to start ride 102, emergency 103, fuel needed 104, food needed 105 and a minor emergency 106. In an embodiment, the interface has four buttons arranged in a square formation. The app 101 allows the rider to quickly and easily send alerts and notifications to other riders by simply tapping the desired alert. In another embodiment, the rider alert options comprise user-selectable graphical interfaces to start ride 102, major emergency 103, fuel 104, and minor emergency 106 comprise colors correlating to the nature of the alert. For example, emergency 103 comprises a red color indicating an emergency. In another example, the minor emergency 106 comprises a yellow color indicating an emergency not as severe as one indicated by emergency 103. In another embodiment, the minor emergency 106 may be use to indicate a rider is hungry and wishes to stop for food or drinks. Similarly, the state ride 102 comprises a green color indicating the rider is ready to begin the ride.

Figure 2:
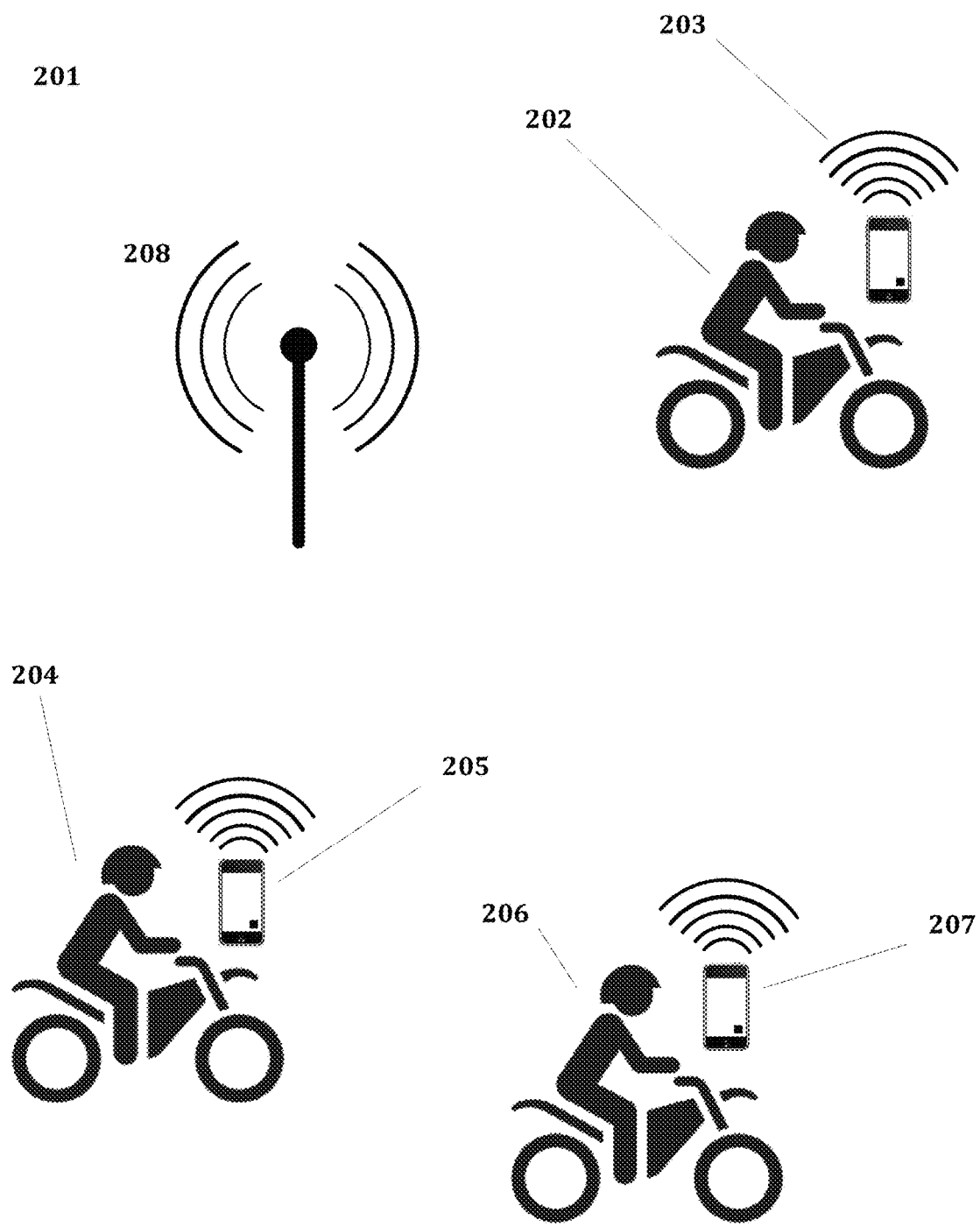
FIG. 2 is an exemplary functional view of the motorcycle communication system implemented by a group of motorcycle riders, according to an embodiment of the present invention.

In another exemplary embodiment of the present disclosure and with reference to FIG. 2, the system comprises a group ride 201 wherein multiple riders are interconnected. The group ride 201 comprises a lead rider 202, a lead rider mobile device 203, a first rider 204, a first rider mobile device 205, a second rider 206 and a second rider mobile device 207. When configuring the group ride 201, the lead rider 202 creates a group name and password within the app installed on the lead rider mobile device 203. The lead rider 202 may invite the first rider 204 and the second rider 206 through the system's search function or through the lead rider mobile device's 203 stored contacts. In another embodiment, the first rider 204 and the second rider 206 may join the group ride 201 by entering the group name and password. In one embodiment, the lead rider mobile device 203, the first rider mobile device 205, and the second rider mobile device 207 communicate with each other over a cellular network 208. In another embodiment, the lead rider mobile device 203, the first rider mobile device 205, and the second rider mobile device 207 directly communicate with each other by using built-in wireless mobile connectivity comprising Bluetooth, Wi-Fi, radio frequency, and infrared. In another embodiment, if the distance between the lead rider 202 and the second rider 206 is too far for the lead rider mobile device 203 to directly communicate with the second rider mobile device 207, the system uses the first rider mobile device 205 to relay the signal between the lead rider mobile device 203 and the second rider mobile device 207. Such a relaying configuration is known in the art as a "daisy chain."

In another exemplary embodiment of the present disclosure and with reference to FIG. 2, the system comprises a group ride 201 comprising an autonomous crash alert. The app installed on the lead rider mobile device 203 continuously monitors the lead rider mobile device's 203 built-in gyroscope, accelerometer, and GPS to determine if the lead rider 203 experiences a crash. The system monitors the lead rider mobile device's 203 acceleration and deceleration and, if such parameters exceed predetermined safe levels, the system concludes that the lead rider 202 has experienced a crash and autonomously generates and sends a crash alert. In one embodiment, the crash alert comprises the location and time where the crash occurred. In another embodiment, the system may send the crash alert to the first rider mobile device 205 and the second rider mobile device 207. In another embodiment, the system may autonomously send the crash alert to contacts stored in the lead rider mobile device 203. In another embodiment, the system may autonomously generate and send the crash alert to emergency personnel. In another embodiment, the system may autonomously generate and send a crash alert to the first rider mobile device 205 and the second rider mobile device 207 providing guidance to the location where the crash occurred. In another embodiment, the system may autonomously send the crash alert over a cellular network 208.

Figure 3:
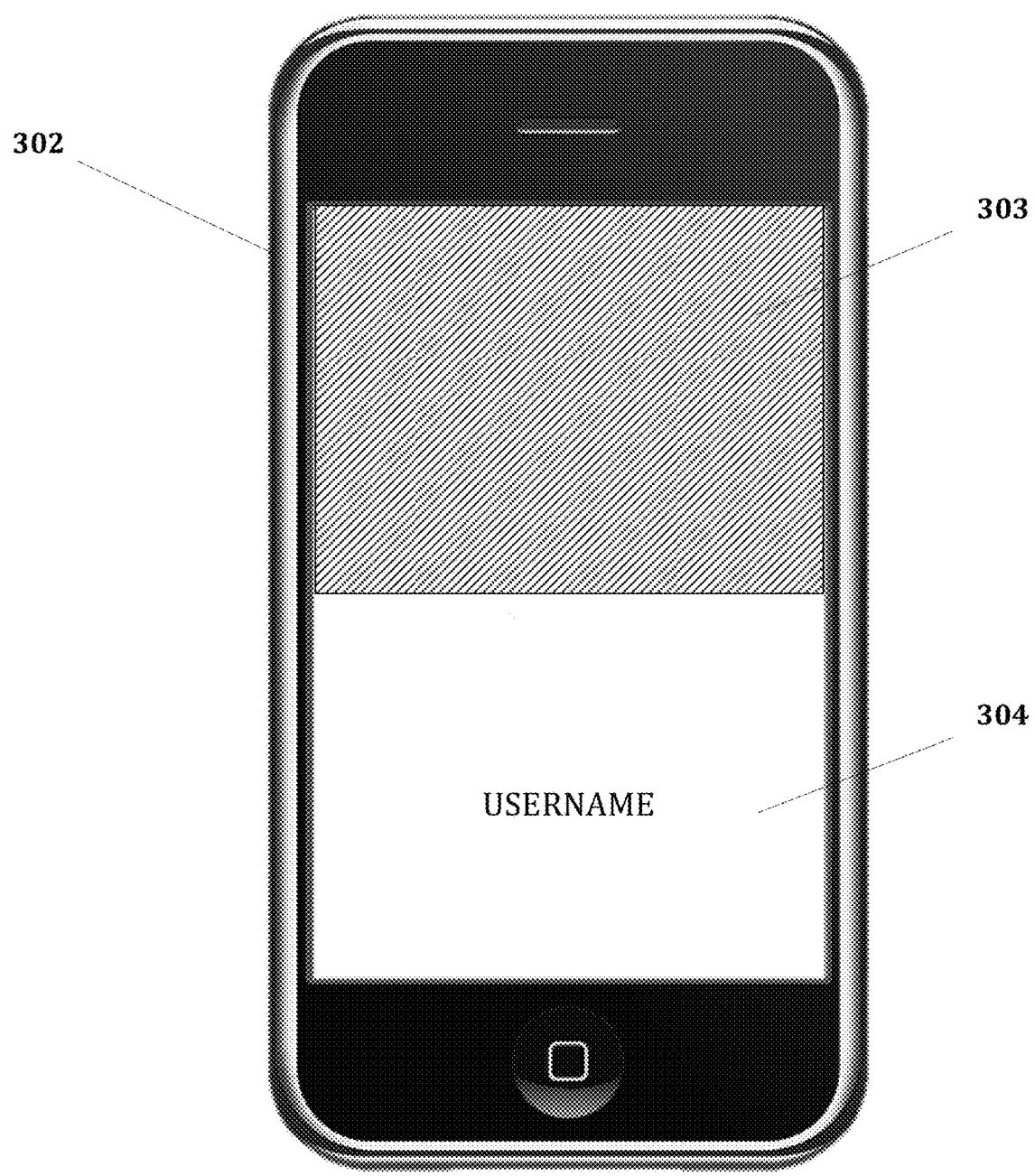
FIG. 3 is an exemplary view of the motorcycle communication system interface, according to an embodiment of the present invention.

In another exemplary embodiment of the present disclosure and with reference to FIG. 3, the app 301 displays a simple user interface on a mobile device 302. In one embodiment, the app displays a two-button screen wherein the alert button 303 and the notification button 304 comprise contrasting colors. In another embodiment, the alert button 303 and the notification button 304 utilize the mobile device's 302 built-in touch screen features to allow the user to interact with the app 301. In one embodiment, the alert button's 303 color corresponds to preset notifications comprising yellow representing caution, red representing to stop, magenta representing an emergency, and green representing good. In another embodiment, the notification button 304 comprises a user name corresponding to the user initiating the alert. In another embodiment, the notification button comprises a color corresponding to the type of notification displayed.

Figure 4:
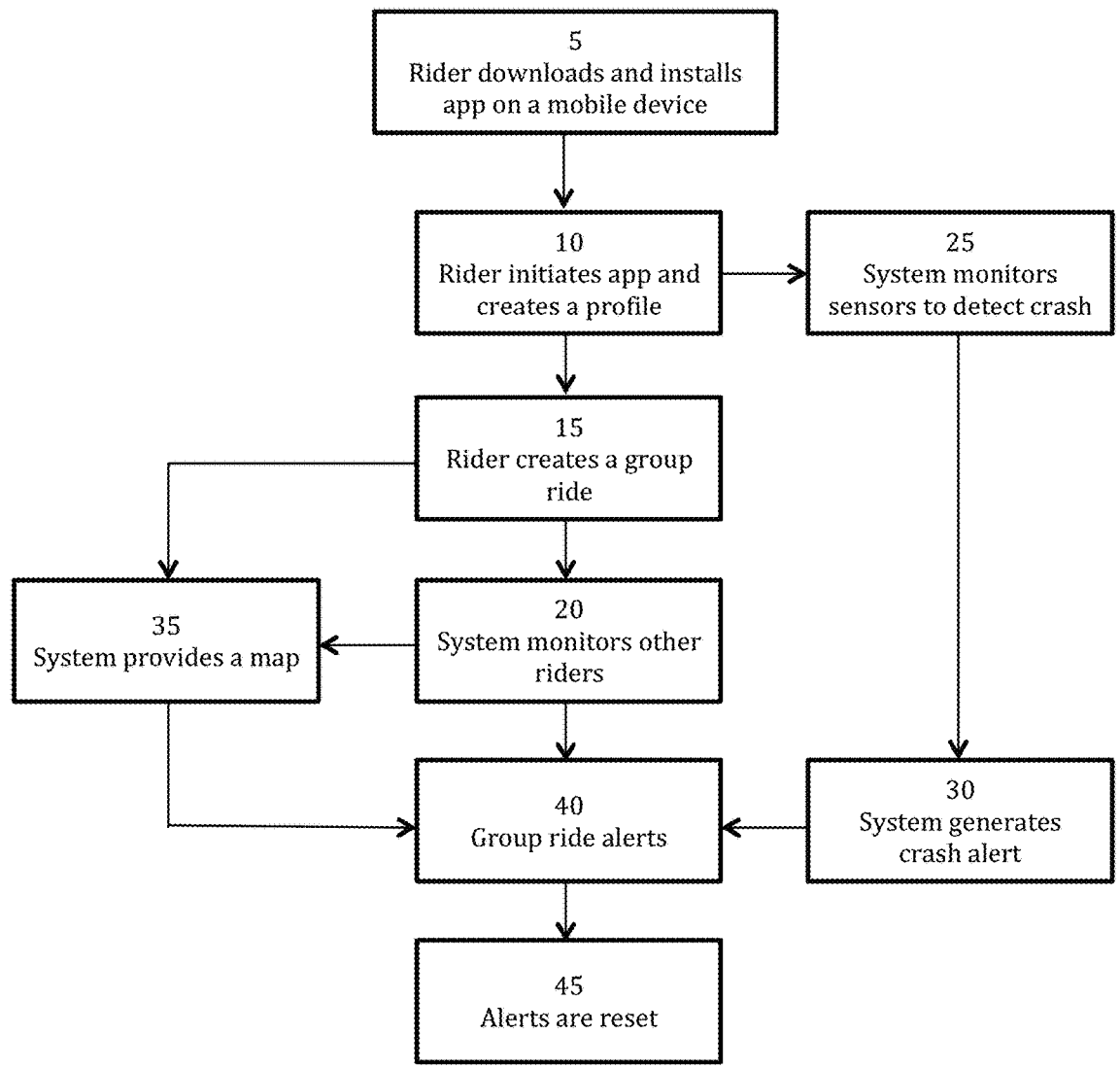
FIG. 4 is an exemplary flow chart of the operation of the motorcycle communication system, according to an embodiment of the present invention.

In another exemplary embodiment of the present disclosure and with reference to FIG. 4, in step 5, the rider downloads and installs an app on a mobile device. In one embodiment, the mobile device comprises a cellular telephone comprising an interactive touch screen, the ability to upload and download information from the Internet, the ability to directly communicate with other mobile devices, built-in position and orientation detecting hardware such as a gyroscope and an accelerometer, and a geo-locating ability such as GPS.

In another exemplary embodiment of the present disclosure and with reference to FIG. 4, in step 10, the rider initiates the app and creates a rider account comprising a username, password, and an alternate form of communication such as a telephone number, an email address, or a social media account. In another embodiment, the rider may specify emergency contact information and automatic alerts.

In another exemplary embodiment of the present disclosure and with reference to FIG. 4, in step 15, the system provides the ability to create a group ride. In one embodiment, the rider creates a group ride and invites other riders to the group using a group request function provided by the app. In one embodiment, the group request function provided through the app may set up an ad hoc network In another embodiment, the rider creates a group ride into which other riders can join by using a predetermined group name and group password. In another exemplary embodiment, the group is created by devices with the system within a certain proximity, which can be done at the start of a ride. In an embodiment, group rides automatically expire after a predetermined period of time has elapsed. In one embodiment, the group rides expire after 24 hours.

In another exemplary embodiment of the present disclosure and with reference to FIG. 4, in step 20 the system monitors other riders. In one embodiment, the system uses geo-locational information provided by each group rider's mobile device comprising GPS and cellular tower triangulation.

In another exemplary embodiment of the present disclosure and with reference to FIG. 4, in step 25, the system monitors the rider's mobile device's built-in acceleration or orientation sensors comprising accelerometers or gyroscopes. In one embodiment, the system may continuously monitor a rider's mobile device for sudden acceleration or deceleration. In another embodiment, the system uses sensors built into or attached to the motorcycle including a gyroscope, an accelerometer, wheel spin sensors, or a speedometer. In one embodiment, the system may have a built-in threshold level of acceleration and, in the event the level is exceed, the system determines the rider may have experienced a crash. In another embodiment, the system monitors the mobile device's built-in gyroscopes to determine the mobile device's orientation. In an embodiment, the system determines the rider may have crashed if the gyroscopic information exceeds predetermined levels. In another embodiment, the system determines the rider has crashed if the gyroscopic and accelerometer sensor information exceed predetermined values.

In another exemplary embodiment of the present disclosure and with reference to FIG. 4, in step 30, the system generates a crash alert if the system determines a rider has crashed. In one embodiment, the system uses the mobile device's built-in clock, GPS, cell tower information, or contacts to generate a crash report. In another embodiment, the system uses sensors built into or attached to the motorcycle to determine whether the rider experiences a crash. In one embodiment, the system may generate a crash alert comprising, the time of the crash, the location of the crash, and the severity of the crash. In another embodiment, the system may send a crash report to a member of a group ride. In another embodiment, the system sends the report to all members of a group ride. In another embodiment, the system may send the crash report to predetermined contacts stored on the mobile device. In another embodiment, the system may autonomously send the crash report to emergency personnel comprising police, fire, or medical. In another embodiment, the system may continuously monitor the mobile device's sensors and, in the even the rider experiences a crash, the system records and stores all sensor information prior to the crash.

In another exemplary embodiment of the present disclosure and with reference to FIG. 4, in step 35, system provides a map to all group riders displaying each group rider's position. In one embodiment and in the even that a rider exceeds a predetermined distance from the group, the system provides a map with directions showing the lost rider the fastest route to rejoin the group. In another embodiment, the map continuously shows the rider's current position and other points of interest comprising restaurants, fuel stations, and real-time traffic hazards. In one embodiment, the system evaluates the severity of turns and alerts the rider of upcoming severe turns. In another embodiment, the system uses built-in maps. In another embodiment, the system uses geographic information downloaded from the Internet as needed by the app comprising GOOGLE MAPS.

In another exemplary embodiment of the present disclosure and with reference to FIG. 4, in step 40, the system generates group ride alerts. In one embodiment, the system may generate a rider lost alert if a rider exceeds a predetermined distance from a group. In one embodiment and in the event the system determines a rider is lost, the system may display a rider lost alert to each member of a group directing the group to pull over while providing directions to the lost rider and the quickest route to rejoin the group. In another embodiment, the system may generate and provide crash alerts if the system determines a rider has crashed. In another embodiment, the system may send alerts to every rider within a predetermined distance of the rider mobile device generating the alert. In another embodiment, a rider may generate a group alert indicating the need to pull over. In one embodiment, the system determines the closest safe location to pull over using third-party mapping information such as GOOGLE MAPS, YELP, or the mobile device's built-in software. In such an instance, the system selects the nearest gas station, rest stop, or restaurant. In another embodiment, the system uses pre-determined safe locations as specified by the user. In one embodiment, the rider may generate an alert indicating that fuel is needed. In another embodiment, a rider may generate a group ride indicating the need for food. In one embodiment, the user may specify a particular location from a user-selectable list or map. In another embodiment, the rider may specify a particular location to pull over to which the system may provide directions on a map. In another embodiment, the app displays predetermined alert icons. In another embodiment, a rider may select a predetermined alert displayed on the rider mobile device of which the system alerts each rider within the group. In another embodiment, the system uses the mobile device's built in GPS and third-party information to determine if the rider is or is about to enter an area with adverse weather conditions. In such an embodiment, the system may alert the rider and provide directions around or away from the adverse weather's area.

In another exemplary embodiment of the present disclosure and with reference to FIG. 4, in step 45, the system resets any alert generated. In one embodiment, any rider within a group ride can reset a group alert. In another embodiment, an alert can only be reset by rider mobile device that generated the alert. In another embodiment, an emergency responder may reset the alert.

Figure 5:
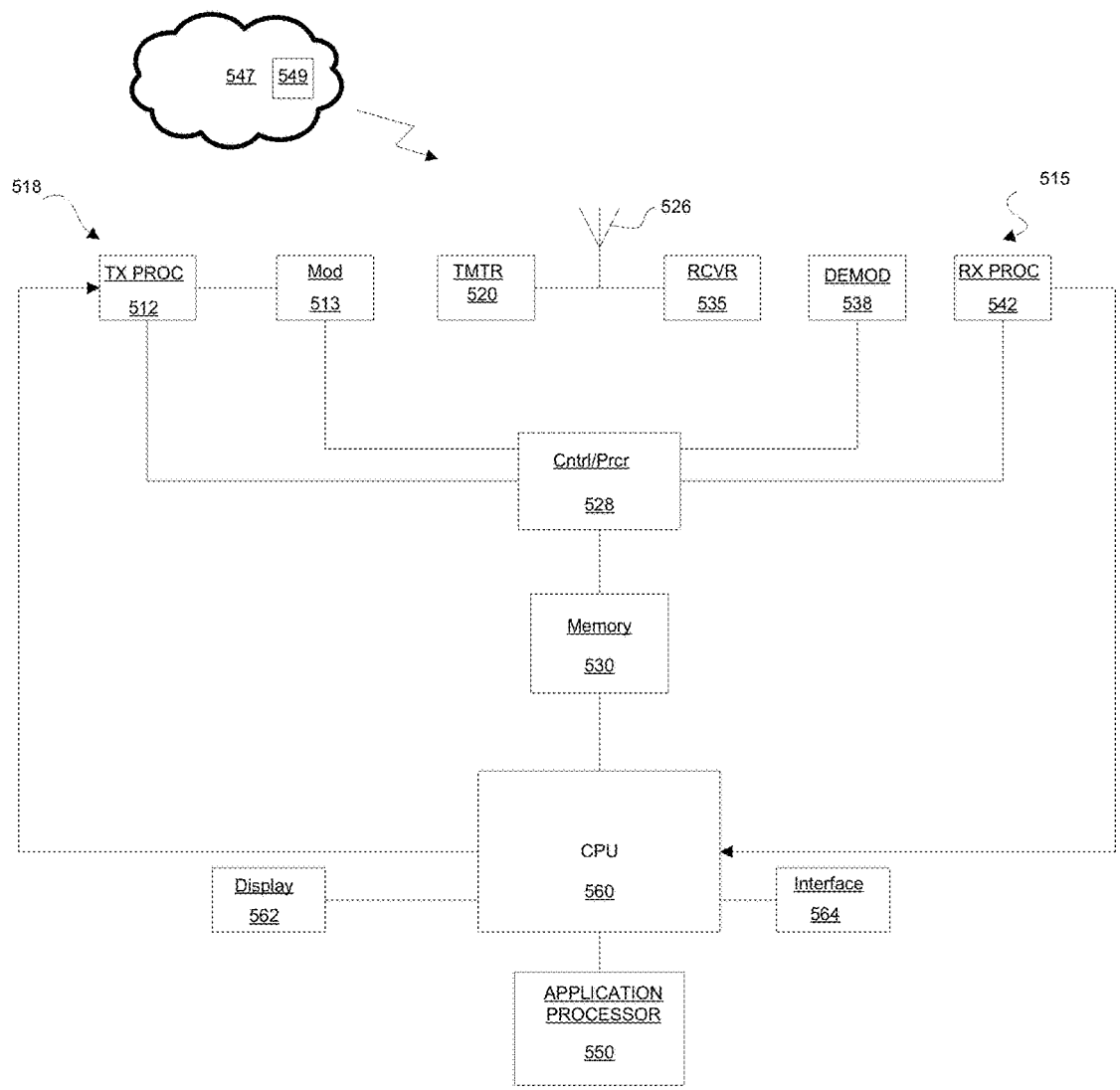
FIG. 5 illustrates a block diagram of an exemplary mobile device for which the foregoing embodiments may be facilitated.

The foregoing embodiments may be carried out in conjunction with a mobile communication device or in conjunction with an application (app) running on or implemented on a mobile communication device. The app may be embodied within a disc, memory stick, flash memory, etc., or it may be transmitted wirelessly or through a cable, etc. Such a mobile communication device includes a mobile phone, such as a smart phone, a phone with less than smart phone capability, a mobile tablet device, etc. An app may operate on the mobile device so as to carry out the foregoing embodiments. FIG. 5 illustrates a block diagram of an exemplary mobile device for which the foregoing embodiments may be facilitated. Further, app 549, shown in FIG. 5 as a download from cloud 547, may facilitate the foregoing embodiments which may be carried out by application processor 550 in connection with central processing unit 560 for the exemplary mobile device shown in FIG. 5. Transmitter 518 and receiver 515 carry out wireless communications. At transmitter 518, transmit (TX) processor 512 receives and processes (e.g., formats, encodes and interleaves, etc.) information and provides coded data to modulator 513. Modulator 513 modulates the coded data and provides a modulated signal to transmission unit 520 which performs operations on the modulated signal such as filtering, amplification and up-conversion to produce a RF modulated signal to be transmitted via antenna 526. Controller/processor 528 directs the operation of transmitter 518. Memory 530 stores programs codes in the form of computer software and data for use by transmitter 518. At receiver 515, a receive (RX) processor 535 conditions (e.g., filters, amplifies ad down-converts) a received RF signal from antenna 526, digitizes the conditioned signal and provides samples to a demodulator 538 which processes the samples to provide demodulated data. A receive data processor 542 processes (e.g., de-interleaves and decodes) the demodulated data. Control processor 528 directs the operation of receiver 515. Memory 530 additionally stores program code in the form of computer software and data used by receiver 515. Although a single antenna 526 is shown, more than one antenna is contemplated. For example, a separate antenna may be used as a transmit antenna and a separate antenna may be used as a receive antenna. Display 562 and Interface 564 (which may represent the touch screen of a phone, tablet, etc.), by which alerts can be viewed and generated, among other things, are also shown in FIG. 5.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A computer-readable, non-transitory, programmable product, stored in memory of a mobile device, comprising code for causing a processor to:

determine a rider location in connection with geo-locator input data;

provide a user-selectable list of contacts retrieved from the mobile device; assemble a group, in order to form a network, based on user input;

determine a group location in connection with processing information containing geographic locations of mobile devices within the group, and determining a geographic center of the group;

generate a distance alert in connection with comparing rider locations to the group location, determining a rider distance based on the rider location and the group location, and determining that a rider location exceeds a predetermined threshold for the rider distance;

determine a rider crash baseline in connection with continuously monitoring an accelerometer, determining an accelerometer average from the accelerometer's measurements over a predetermined period, monitoring a gyroscope, and determining a gyroscope average from the gyroscope's readings over a predetermined period;

monitor for a crash in connection with comparing measurements from the accelerometer to the accelerometer average in real-time, generating a crash alert if the accelerometer measurements exceed the accelerometer average, comparing measurements from the gyroscope to the gyroscope average in real-time, generating the crash alert if the gyroscope measurements exceed the gyroscope average, adding the mobile device's geographic location to the crash alert, and causing the presentation of the crash alert on a display for a predetermined period, and causing the dispatch of the crash alert over a wireless network if the crash alert is not rejected by a user.

2. The computer-readable, non-transitory, programmable product as recited in claim 1 which further causes monitoring for a crash, by the processor, in connection with receiving vehicle sensor information from
   a. a plurality of vehicle sensors and
   b. wherein the monitoring for a crash comprises:
      i. connecting to the plurality of vehicle sensors;
      ii. interfacing with the plurality of vehicle sensors; and
      iii. monitoring the plurality of vehicle sensors.

3. The computer-readable, non-transitory programmable product as recited in claim 1 which further causes a processor to cause the dispatch of a user-generated alert in connection with causing the:
   a. display of a plurality of alerts available for dispatch;
   b. selection of the alert based on user input;
   c. accompaniment, with the alert, of the geographical location of the mobile device;
   d. dispatch of the alert to other mobile devices; and
   e. display of driving directions.

4. The computer-readable programmable product as recited in claim 1 which further causes as processor to generate one or more alerts comprising:
   a. a gas alert in connection with causing the display of a graphical representation relating to gasoline or a color corresponding to needing gasoline;
   b. a food alert in connection with causing the display of a graphical representation relating to food or a color corresponding to needing food;
   c. an emergency alert in connection with causing the display of a graphical representation relating to an emergency or a color corresponding to an emergency; and
   d. a non-emergency alert in connection with causing the display of a graphical representation relating to facilitating a non-emergency stop or relating to a color corresponding to a non-emergency stop.

\* \* \* \* \*